United States Patent [19]

Yano et al.

[11] Patent Number: 4,788,759

[45] Date of Patent: Dec. 6, 1988

[54] METHOD AND APPARATUS FOR MANUFACTURING STEERING WHEEL

[75] Inventors: Isamu Yano, Sagamihara; Kiyoshi Hani; Shu Yamashita, both of Amagasaki; Kazuo Kawabata; Naoyuki Kogure, both of Sagamihara, all of Japan

[73] Assignee: Mitsubishi Denki Kabushiki Kaisha, Tokyo, Japan

[21] Appl. No.: 935,229

[22] PCT Filed: Mar. 18, 1986

[86] PCT No.: PCT/JP86/00132

§ 371 Date: Nov. 14, 1986

§ 102(e) Date: Nov. 14, 1986

[87] PCT Pub. No.: WO86/05454

PCT Pub. Date: Sep. 25, 1986

[30] Foreign Application Priority Data

| Mar. 18, 1985 | [JP] | Japan | 60-53602 |
| Mar. 19, 1985 | [JP] | Japan | 60-55071 |
| Mar. 19, 1985 | [JP] | Japan | 60-55072 |
| Mar. 19, 1985 | [JP] | Japan | 60-39378 |

[51] Int. Cl.⁴ .................................. B21D 53/26
[52] U.S. Cl. ......................... 29/159 B; 29/611; 74/558
[58] Field of Search ............. 29/159 B, 611; 74/552, 74/558

[56] References Cited

U.S. PATENT DOCUMENTS

| 2,327,931 | 8/1943 | Ratner | 74/558 |
| 4,385,957 | 5/1983 | Wackerle et al. | 29/611 |
| 4,547,655 | 10/1985 | Kurata et al. | 74/552 |
| 4,584,900 | 4/1986 | Masuda | 74/552 |
| 4,633,734 | 1/1987 | Yano et al. | 74/552 |
| 4,635,500 | 1/1987 | Overcashier et al. | 74/552 |

FOREIGN PATENT DOCUMENTS

| 109460 | 6/1984 | Japan . |
| 120568 | 7/1984 | Japan . |
| 222236 | 11/1985 | Japan . |
| 2109291 | 6/1983 | United Kingdom . |

Primary Examiner—P. W. Echols
Attorney, Agent, or Firm—Sughrue, Mion, Zinn, Macpeak and Seas

[57] ABSTRACT

To manufacture a steering wheel rim, a sleeve 21 is formed by a braiding machine 12 by interlacing and braiding unidirectional fibers 10. A coil-shaped lightweight core 9 is then inserted by a covering apparatus 14 into the braided sleeve, and core rings are cut out from the coil. The ends of the cut rings are butted to form the rims, and after being joined with a spoke 2 are placed in a mold 31, where an outer molded layer 11 is formed by injecting a thermosetting resin into the mold and heat curing it.

12 Claims, 12 Drawing Sheets

METHOD AND APPARATUS FOR MANUFACTURING STEERING WHEEL

TECHNICAL FIELD

This invention relates to a method and apparatus for manufacturing the rim portion of a steering wheel.

BACKGROUND ART

In general, a steering wheel for an automobile has a structure as shown in FIGS. 1 and 2, in which FIG. 1 is a side view of the steering wheel secured to a steering shaft, and FIG. 2 is a front view thereof. In FIGS. 1 and 2, reference numeral 1 designates a ring-shaped rim forming a grip for the driver, 2 designates a spoke fixed to the inside of the rim 1, and 3 designates a boss fixed to the spoke 2 at the center of the rim 1. The boss 3 serves as a mounting hub for a steering shaft 4. In the steering wheel configured as mentioned above, it has been usual to form not only the core material of the rim 1, but also the spoke 2 and boss 3 from metal such as a carbon steel or the like, weld the core material of the rim 1 to the spoke and the spoke to the boss 3, and mold the outer layer of the rim 1 with rubber or resin.

Since most of such a steering wheel is formed from metal and weighs at least 2 Kg, vibrations are caused in the steering wheel, in particular, when the automobile is running at high speeds. Thus, drawbacks are involved in that steering stability is degraded and discomfort is caused to the driver.

Accordingly, to reduce the weight of the steering wheel without impairing its rigidity and to improve its vibration characteristics, commonly assigned Japanese Kokai publication No. 60-222236 published on Nov. 6, 1985 describes a method for manufacturing a steering wheel which is lightweight and which is formed from fiber reinforced plastic. FIGS. 3 to 8 show this proposed manufacturing method for a steering wheel, in which FIG. 3 is a front view of the steering wheel, FIG. 4 is a sectional view taken along the line IV—IV in FIG. 3, FIG. 5 is a sectional view taken along line V—V in FIG. 3, FIG. 6 is a perspective view of a coil-shaped lightweight core material for producing the rim continuously, FIG. 7 is a partially enlarged view showing a connection at abutting ends of a ring-shaped portion of a predetermined length cut from the coil-shaped core material of FIG. 6, and FIG. 8 is a sectional view taken along line VIII—VIII in FIG. 3.

In the FIGURES, reference numeral 1 designates a rim having a diameter of about 2 cm, manufactured in the following manner. A prepreg 5 cured lightly after impregnation with unidirectional fibers consisting of a sole or composite body of carbon fibers, glass fibers, or aramid fiber is wound around a coil-shaped lightweight core material 9 of foamed urethane foam, and the coil-shaped lightweight core material 9 having the prepreg 5 wound thereon is cut in a predetermined length of a ring shape at a connecting portion with a spoke 2. Both ends of the cut-out portion from the remainder are butted, and an outer molded layer 6 is formed surrounding the prepreg 5 by molding a rubber or resin. The diameter of the rim 1 is reduced at the two connecting portions with the spoke 2. Reference numeral 7 designates a slip-preventing portion having an undulate shape formed on the outer molded layer 6. The spoke 2 is made of metal, and is connected to the rim 1 such that one end of the spoke 2 is in contact with the prepreg 5 wound around the coil-shaped lightweight core material 9 at the diameter reduced connecting portion of the rim 1, and in contact with a joining piece 42 and a U-shaped thin metal sheet 41, and the one end of the spoke 2 is wrapped in a prepreg 5 or a cloth prepreg (not shown) and cured by heating to achieve the connection.

The steering wheel configured as described above is manufactured in a process in which the prepreg 5 is first wound around the coil-shaped lightweight core material 9 at a constant positive angle between 10° and 60° by a winding machine, and then is further wound at a constant negative angle between −10° and −60° so that it intersects the previously wound prepreg turns to form a coil-shaped laminated body. Such body is cut to a length required for the rim 1, and the cut ends of the rim portion are joined to each other to form a joining portion 30 as shown in FIG. 7. Following this, as shown in FIG. 8, it is connected to the spoke 2, wrapped in a prepreg 5, cured by heating, and then, it is placed in a metal mold for molding and the outer molded layer 6 of rubber or resin is formed.

Since the manufacturing method described above includes the process of winding the prepreg around the coil-shaped lightweight core material 9, an expensive winding machine is required, which performs complicated motions to move along a coil-shaped path while rotating about the coil-shaped lightweight core material 9, and thus the costs are increased.

Furthermore, in order that the winding machine moves along the coil-shaped path while rotating about the core material 9, the pitch of the core material must be in a range from about 30 to 40 cm per revolution, and thus, the winding machine must be large in size. Further, after the winding, curing by heating, and laminating, both ends of the laminated core material are closed off by strings or the like, and the core material is cut to into the required lengths for the rim 1. However, in this case, at the time of forming each cut length into a ring-shape, since it is pressed until it becomes flattened, when the pitch or fiber winding angle is large, the prepreg 5 will tend to become loosened and delaminated, and torsion will be caused in the prepreg 5 resulting in an irregular alignment of the fibers. Moreover, since the fibers impregnated with resin are exposed to the outside at the surface of the outer layer as a result of the process for curing by heating, and laminating the prepreg 5, when the driver grips the steering wheel, hurt and discomfort will be caused due to the surface projections of the fibers. To eliminate such discomfort, and also to form the undulation which serves as the slip preventing portion 7, the process for forming the outer molded layer 6 is needed additionally, and this gives rise to a problem in that the cost of equipment and the number of processes are increased.

SUMMARY OF THE INVENTION

A manufacturing method and apparatus for a steering wheel in accordance with the present invention was made to solve the problems as mentioned above, and it is an object of the present invention to provide a manufacturing method and apparatus in which the prepreg 5 can be wound around the coil-shaped lightweight core material 9 and can be laminated by heating and pressing by a simple apparatus and process, and in which the outer molded layer 6 is not required to be formed in a separate process.

BRIEF DESCRIPTION OF THE DRAWINGS

In the drawings:

FIGS. 9 to 16 show an embodiment of the present invention in which;

FIG. 9 is a front view of a steering wheel;

FIG. 10 is a sectional view taken along line X—X in FIG. 9;

FIG. 11 is a sectional view taken along line XI—XI in FIG. 9;

FIG. 12 is a front view illustrating a braiding and covering process;

FIG. 13 is a plane view of FIG. 12;

FIG. 14 is a front view showing a joining condition of a rim and a spoke;

FIG. 15 is a perspective view illustrating a resin injection and heating process;

FIG. 16 is a view showing the steering wheel within the metal mold of FIG. 15 as viewed from above by cutting the metal mold at the boundary between an upper mold and a lower mold;

FIGS. 21 to 23 show another embodiment of the present invention, in which;

FIG. 21 is a sectional view of a rim portion;

FIG. 22 is an enlarged view of the B portion in FIG. 21; and

FIG. 23 is a view illustrating a manufacturing method of the steering wheel shown in FIG. 21.

DISCLOSURE OF THE INVENTION

Figure 1:
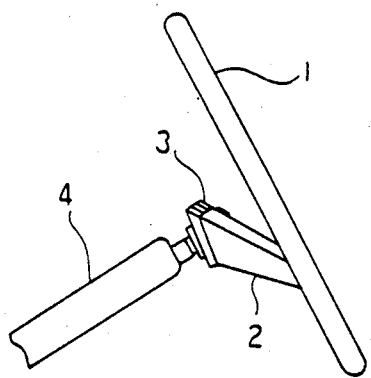
FIG. 1 is a side view of a steering wheel showing the fixing thereof.
Figure 2:
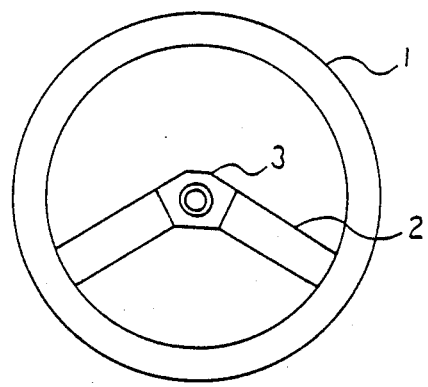
FIG. 2 is a front view of the steering wheel of FIG. 1.
Figure 3:
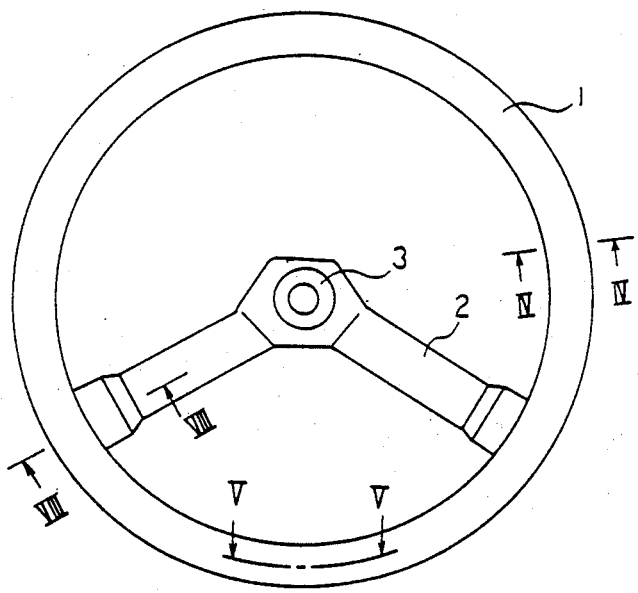
FIG. 3 is a front view of an earlier steering wheel.
Figure 4:
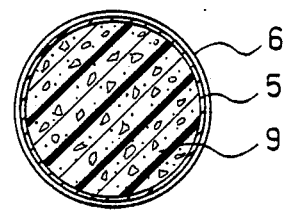
FIG. 4 is a sectional view taken along the line IV—IV in FIG. 3.
Figure 5:
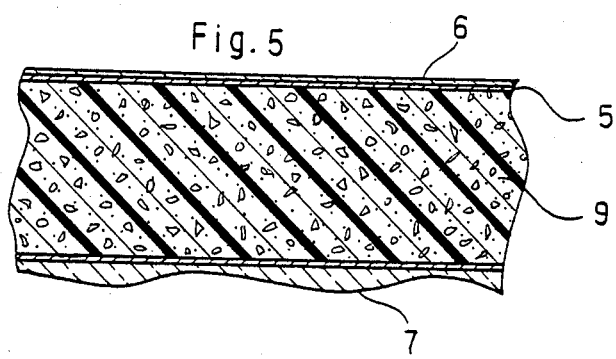
FIG. 5 is a sectional view taken along the line V—V in FIG. 3.
Figure 6:
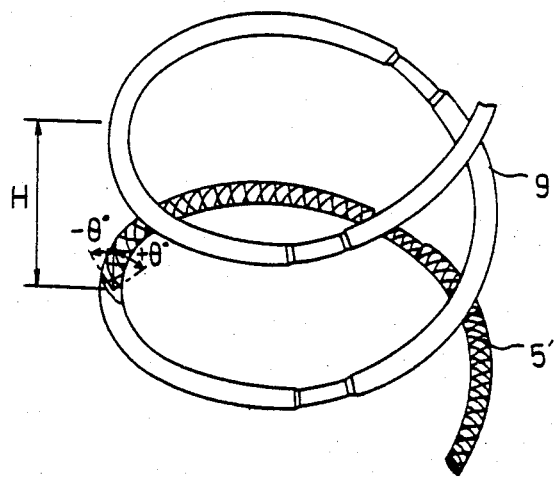
FIG. 6 is a perspective view showing a coil-shaped laminated body.
Figure 7:
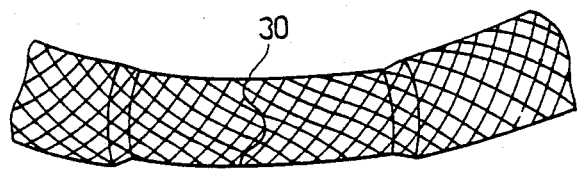
FIG. 7 is a partially enlarged view showing a connecting condition at butting ends of a ring-shaped portion having a predetermined length cut from the coil-shaped laminated body of FIG. 6.

In a manufacturing method of a steering wheel in accordance with the present invention, first, unidirectional fiber is interlaced and braided by a general-purpose braiding machine to form a braided double-woven belt of a sleeve shape. Then, a coil-shaped lightweight core material is continuously inserted into the sleeve-shaped braided double-woven belt, and it is cut in a length required for a rim after fastening and fixing both ends of the braided double-woven belt having the required length to the lightweight core.

Following this, a spoke and the rim portion are joined by wrapping them in a braided double-woven belt of unidirectional fiber formed separately, or in a cloth, and then, the integrally joined rim and spoke are placed in a metal mold. The inside of the metal mold is evacuated, and the mold is heated, and a fluid thermosetting resin which has been sufficiently dehydrated is injected and is cured. By employing such a manufacturing method, a complicated, expensive winding machine is dispensed with, and an outer layer molding can be achieved at the same time.

BEST MODE OF CARRYING OUT THE INVENTION

Hereinafter, an embodiment of the present invention will be described with reference to the drawings. FIGS. 9 to 16 show an embodiment of a manufacturing method of a steering wheel in accordance with the present invention.

Reference numerals 1 to 7 and 9 designate identical or equivalent parts to those described above, and an explanation thereof is omitted. Reference numeral 10 designates unidirectional fiber consisting of a sole or composite body of carbon fiber, glass fiber, or aramid fiber, which is interlaced and braided by a general purpose braiding machine 12 and which is made to cover a coil-shaped lightweight core material 9 by a covering apparatus 14. Reference numeral 42 designates a joining piece formed of a braided double-woven belt of unidirectional fiber or a cloth for joining the spoke 2 and the rim 1. Numeral 11 designates a thermosetting resin which is liquid before being cured by heating and composed of at least one of epoxy, polyester, vinyl ester, and acryl, and the unidirectional fiber 10 and joining piece 42 are impregnated with the thermosetting resin 11, and also an outer layer is formed of this thermosetting resin 11.

Figure 12:
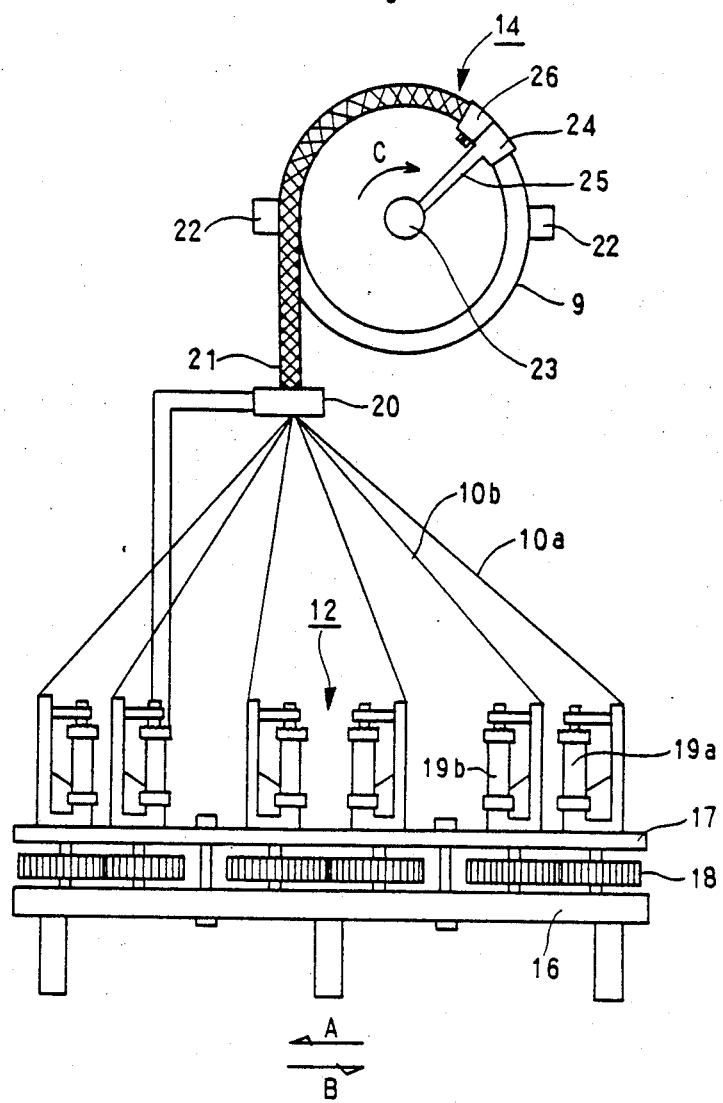
Figure 13:
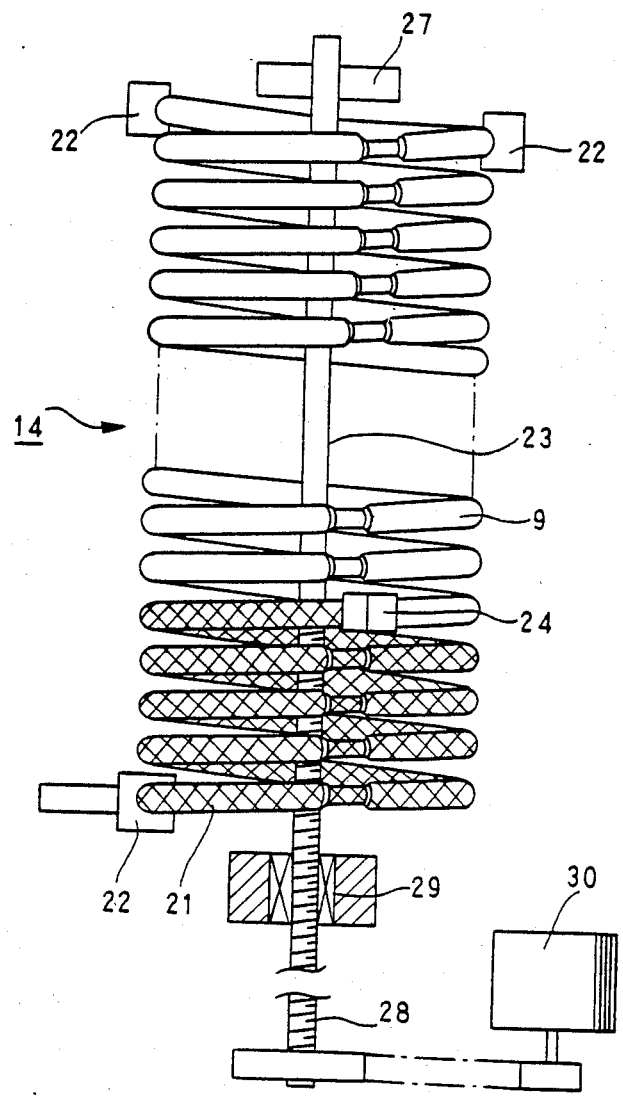
Figure 14:
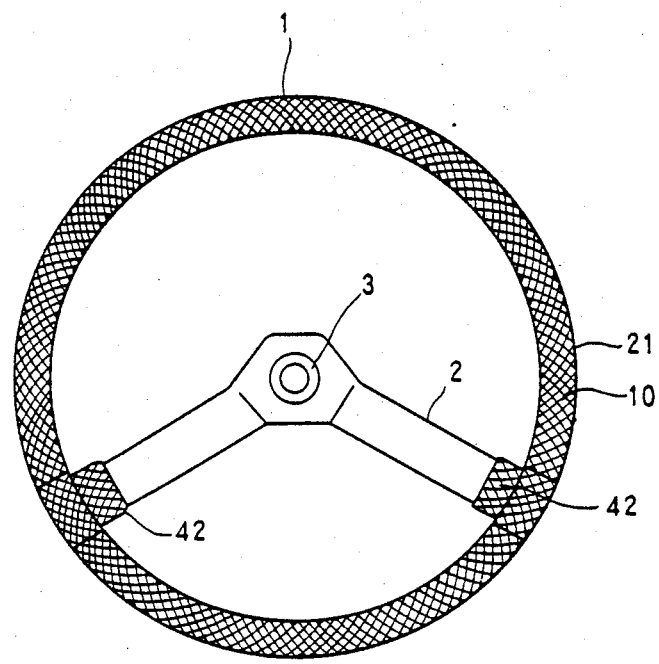

The general purpose braiding machine 12 manufactures braided products such as a rubber string, electric wire, hose, etc., and is known in the art, for example, Composite Materials Handbook authored by Melm Schwartz, P4.97–4.101. The braiding machine 12 is structured to include a number of braid driving gears 18 disposed between a lower plate 16 and an upper plate 17, and guide channels (not shown) are provided on a disk along the periphery thereof and have a shape of two sine curves intersecting each other with a phase difference of 180°. The gears 18 engage further gears (not shown) provided on a base portion so that a plurality of sets of bobbins 19a, 19b are moved along the guide channels, wherein the bobbins 19a and 19b, driven by the gears 18, move respectively in opposite directions while crossing over alternately along the guide channels such that each bobbin 19a rotates and moves in a direction of A (FIG. 12) whereas each bobbin 19b rotates and moves in a direction of B (FIG. 12). As a result, unidirectional fibers 10a and 10b respectively delivered from the bobbins 19a and 19b are braided at a former 20, and a braided sleeve 21 is continuously formed. Further, reference numeral 14 designates a covering apparatus which cooperates with the braiding machine 12, and the coil-shaped lightweight core material 9 is held by a holding fitting 22 so that one end of the lightweight core material 9 is positioned opposite to the former 20. Numeral 23 designates a feed rod disposed at the center of the coil-shaped lightweight core material 9, and numeral 24 designates a guide fitting attached to the feed rod 23 by means of an arm 25. One end of the arm 25 is secured to the feed rod 23 so that the guide fitting 24 moves in a direction C in FIG. 12 along the core material 9 in order to cover the core material 9 with the braided sleeve 21. Numeral 26 designates a clamp for fixing the front end of the braided sleeve 21 to the guide fitting 24. FIG. 13 shows the covering apparatus 14 in FIG. 12 in more detail, and reference numeral 27 designates a bearing for supporting one end of the feed rod 23, and numeral 28 designates a threaded portion formed on the feed rod 23 at the opposite side of the bearing 27 and having the same pitch as that of the core material 9. Numeral 29 designates a threaded bearing which engages the threaded portion of the feed rod 23, and numeral 30 designates a motor for imparting mechanical power to the feed rod 23 in synchronism with the braiding machine.

Figure 15:
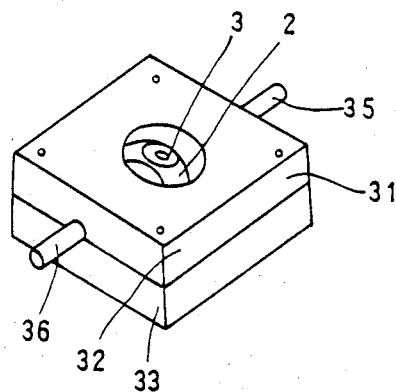
Figure 16:
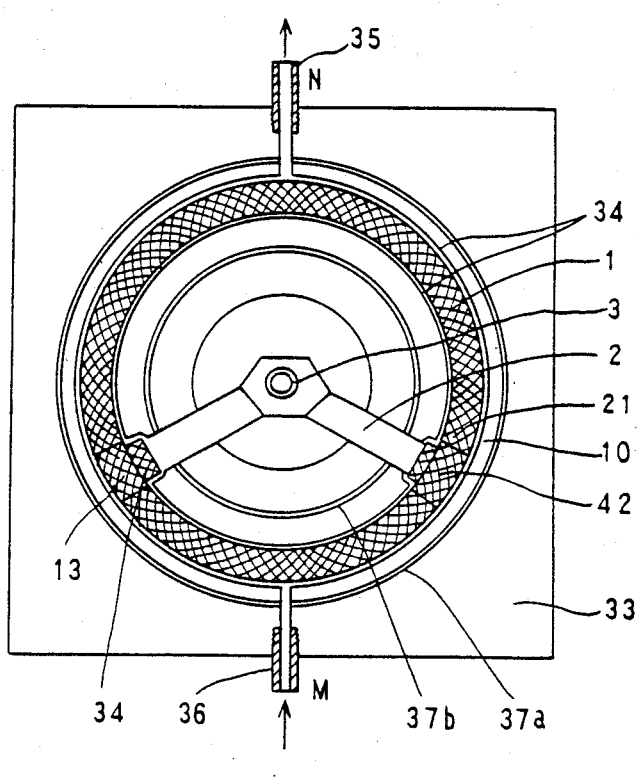
Figure 17:
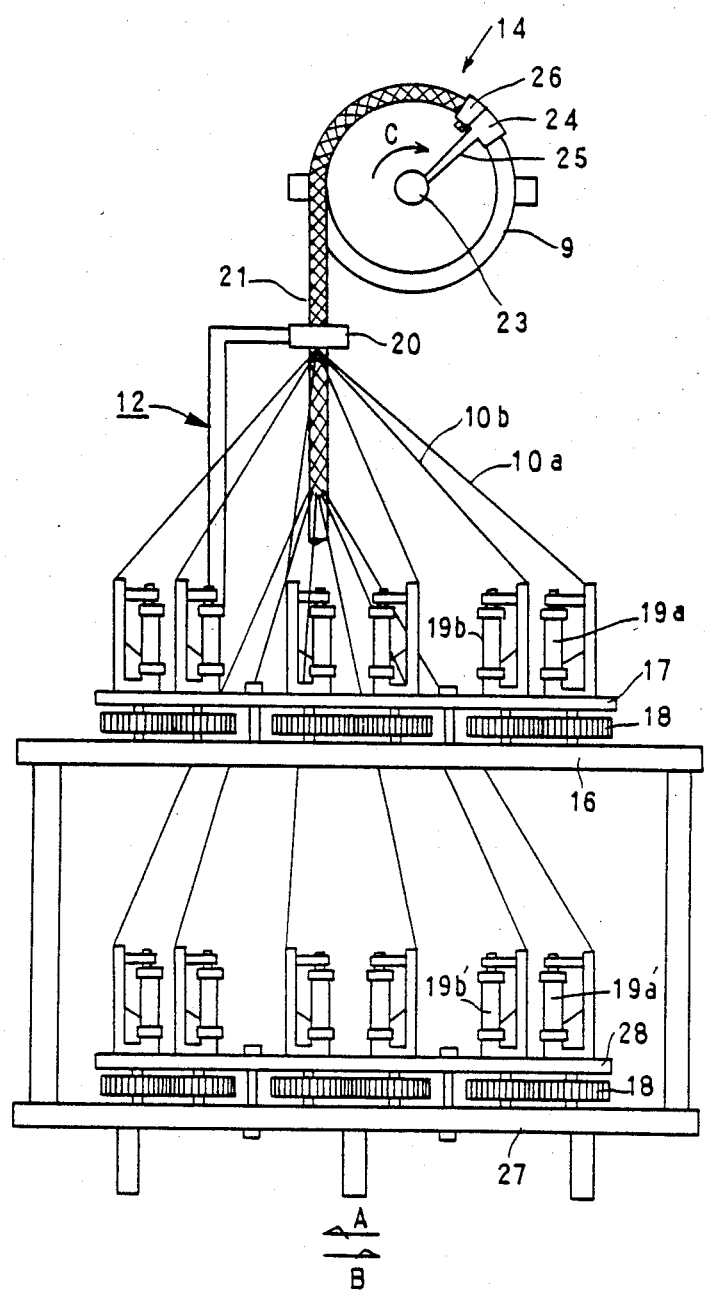
FIG. 17 is a front view illustrating a manufacturing method for a steering wheel of a second embodiment in accordance with the present invention.
Figure 18:
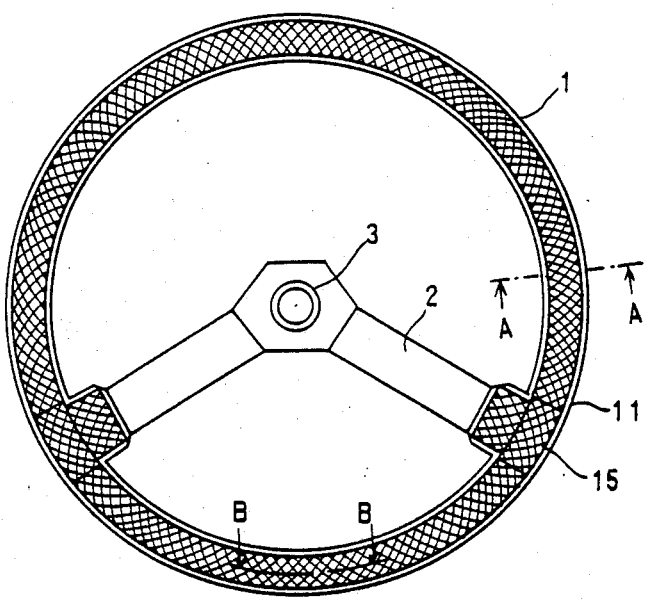
FIG. 18 is a front view of the steering wheel manufactured in the second embodiment.
Figure 19:
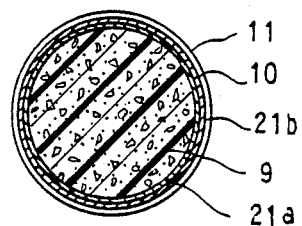
FIG. 19 is a sectional view taken along line A—A in FIG. 18.
Figure 20:
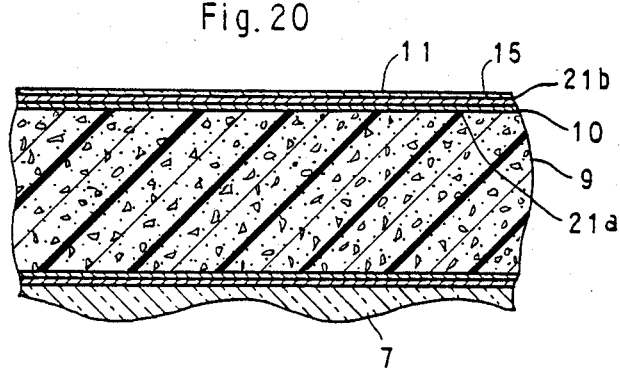
FIG. 20 is a sectional view taken along line B—B in FIG. 18.

Further, in FIGS. 15 and 16, reference numeral 31 designates an injection mold consisting of an upper mold 32 and a lower mold 33. Numeral 34 designates a cavity formed in the upper mold 32 and the lower mold 33 for enclosing the rim 1 and the spoke 2 covered with the unidirectional fiber 10, and an evacuating port 35 for drawing a vacuum, and an injection port 36 for injecting a thermosetting resin 11 are provided. Numerals 37a and 37b designate packings for sealing the cavity 34 airtightly and for preventing leak in drawing a vacuum.

The steering wheel is manufactured by using the aforementioned machine, apparatus and jigs in a manner as will be described hereinafter. First, the coil-shaped lightweight core material 9 is manufactured, and then a coil-shaped laminated body having the unidirectional fiber 10 oriented is manufactured. More specifically, first, the braid driving gears 18 of the braiding machine 12 are driven, and the unidirectional fibers 10a and 10b delivered from the bobbins 19a and 19b are braided at the former 20, and the braided sleeve 21 is continuously formed so that the unidirectional fibers 10a and 10b cross each other extending respectively at orientation angles between 10° and 45° in opposite directions with respect to the longer direction of the braided sleeve 21. The orientation angles are determined depending on the circumferential length of the braided sleeve 21, and the a size and the number of the unidirectional fibers 10a and 10b to be used.

Figure 8:
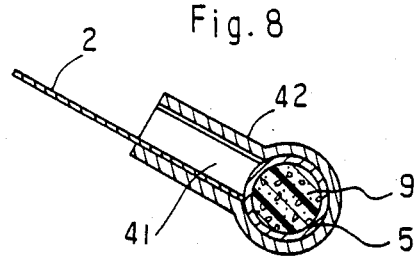
FIG. 8 is a sectional view taken along the line VIII—VIII in FIG. 3.
Figure 9:
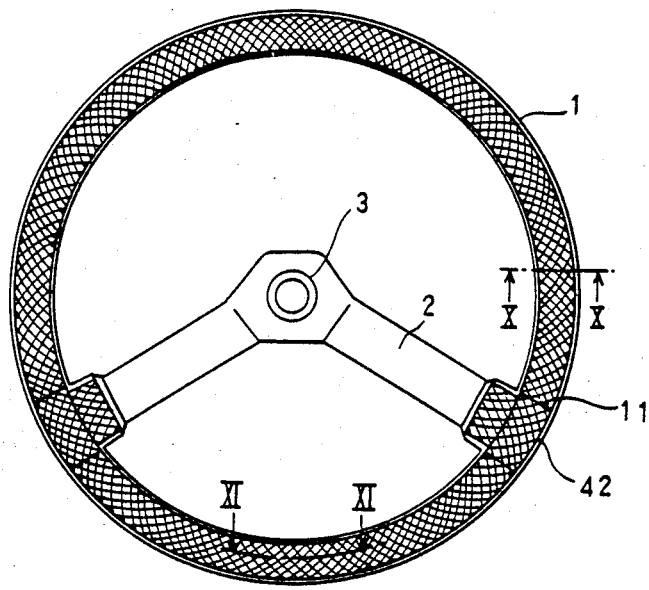
Figure 10:
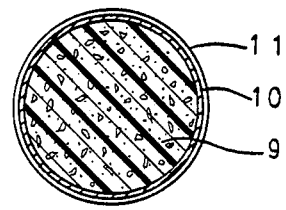
Figure 11:
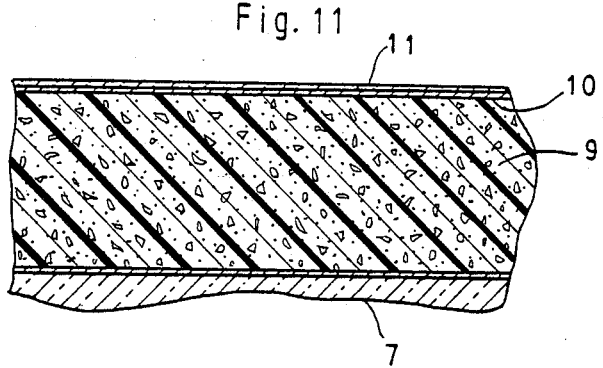

Next, in the covering apparatus 14, the front end of the braided sleeve 21 is secured by the guide fitting 24, the core material 9 is inserted into the braided sleeve 21, the feed rod 23 is driven by the motor 30, the arm 25 attached to the feed rod 23 is turned, and the guide fitting 24 is moved along the core material 9 at a circumferential speed of the braided sleeve 21 so that the braided sleeve is advanced in the direction of arrow C in FIG. 12 to surround the core material 9. The core material covered with the braided sleeve 21 is cut at a connecting portion with the spoke 2 so that the cut portion or segment remaining has a ring shape and a required length. Both ends of the cut portion are butted to form the ring shape. Then, in a similar manner as shown in FIG. 8, the connecting portion of the rim 1 to the spoke 2 together with a U-shaped thin metal sheet 41 are wrapped in a joining piece 42 of a braided sleeve of unidirectional fiber produced separately, or of a cloth. The butt joint of the core material 9 is wrapped by one of the joining pieces 42.

Following this, the joined rim 1 and spoke 2 are set in the cavity 34 of the lower mold 33 of the injection mold 31, and after closing the cavity 34 by the upper mold 32, the cavity is sealed with the packings 37a and 37b or render it airtight, and a vacuum is drawn from the evacuating port 35. Next, the liquid thermosetting resin 11 deaerated sufficiently beforehand is injected and cured by heating so that the unidirectional fiber 10 is impregnated with the thermosetting resin 11 and a thin outer molded layer 11 is formed. Since the outer molded layer is void-free, a rim portion with a superior appearance can be formed. Moreover, a further outer molded layer of a material providing smooth feeling such as rubber, foamed plastic, or the like may be molded on a part or all of the rim over the outer surface of the aforementioned outer molded layer 11 which then becomes an inner molded layer. As a result of this, a steering wheel providing soft touch feeling can be obtained.

Since only a slight twist is caused in the core material, a rim having no delamination and slack of the unidirectional fiber, and having no irregularities in the orientation of the fiber can be manufactured. Further, the formation of an outer molded layer by injection and heating of a resin, and the impregnation of the unidirectional fiber with the resin and the curing thereof can be carried out together in the same process, and thus, the number of processes can be reduced advantageously.

FIGS. 17 to 20 illustrate another embodiment of this invention wherein a steering wheel which is tough against bending and torsion is realized.

More specifically, as shown in FIGS. 9 to 16, when it is desired to improve the strength of the rim by braiding unidirectional fiber 10 around a coil-shaped lightweight core material 9 by a braiding machine, such an object is normally attained by increasing the number or size of unidirectional fibers 10. However, there arise the following problems:

(1) When unidirectional fibers 10 having a large size, or an increased number of unidirectional fibers 10 are used unreasonably for a rim which is required, in particular, to be bent and twisted, rubbing of the fibers is caused during braiding. As a result, the strength is reduced, and the impregnation with an injected liquid thermosetting resin becomes difficult, and sometimes unimpregnated portions remain. Thus, such a braid involves serious defects as a composite material.

(2) To minimize bending, it is advantageous to braid the fiber at an orientation angle of nearly 0° with respect to its longitudinal direction, and to minimize torsion, an orientation angle of 45° is advantageous. Accordingly, it is impossible to manufacture a steering wheel which provides the required strength against both bending and torsion by merely braiding one kind of fiber in a single layer at one orientation angle.

The second embodiment was made to solve the problems mentioned above, and it is designed to obtain a steering wheel which is strong against both bending and torsion by covering two, outer and inner layers, around a coil-shaped lightweight core material with a braided double-woven belt formed by braiding unidirectional fiber in a sleeve shape.

In FIGS. 17-20, reference numeral 27 designates a lower plate located at the bottom portion of the braiding machine 12. Between the lower plate 27 and an upper plate 28 which is paired with the lower plate, there are provided a number of additional braid driving gears 18, and on the upper plate 28, there are provided further bobbins 19a' and 19b' which are movable respectively along two sine-curve shaped channels (not shown) intersecting each other with a phase difference of 180° and formed along the periphery of a disk. Unidirectional fibers 10 are delivered from these bobbins 19a' and 19b', and a first braided sleeve 21a is produced in which the respective axial orientation angles of the unidirectional fibers 10 are +10° and −10°. Also, in this embodiment, the upper delivery section of unidirectional fibers 10a and 10b, constructed as shown in FIG. 12, has holes at the centers of the lower plate 16 and upper plate 17 for passing the lower delivery section fibers therethrough. The center of the upper delivery section is aligned with the core material 9. Reference numeral 21b designates a second braided sleeve produced by braiding the unidirectional fibers 10a and 10b extending from the bobbins 19a and 19b to a former 20 whose position is shifted in the upward direction. The second braided sleeve 21b is formed outside and surrounding the first braided sleeve 21a, and is braided with axial orientation angles of +45° and −45° respectively for the unidirectional fibers 10a and 10b.

The steering wheel is manufactured by the apparatus described above in the following manner. First, the core material 9 is manufactured, and then, a coil-shaped laminated body having unidirectional fibers 10 is manufactured as described below.

Firstly, the unidirectional fibers 10, for example, glass fibers extending at the orientation angles +10° and −10° toward the core material 9 from the lower delivery section of the braiding machine 12 are braided, and the first braided sleeve 21a is produced. Then, the unidirectional fibers 10a and 10b, for example, carbon fibers extending from the upper delivery section are braided at orientation angles of +40° and −40° surrounding the first braided sleeve 21a, and the second braided sleeve 21b is produced. Thus, at the former 20, the first and second braided sleeves 21a and 21b formed in two layers are continuously manufactured.

The first and second sleeves 21a and 21b may be formed with the same kind of fibers. However, as described above, when glass fiber which is particularly inexpensive is used for the inner sleeve, and carbon fiber which has high strength and which is light is used for the outer sleeve, a steering wheel with enhanced strength against bending and torsion and which is lightweight can be obtained.

Next, in a covering apparatus 14, the front ends of the first and second braided sleeves 21a and 21b are secured by a guide fitting 24, and the core material 9 is inserted into the sleeves. Then, by turning the guide fitting 24, the sleeves 21a and 21b are advanced in the direction of arrow C in FIG. 17 to cover or surround the core material 9. The covered core is then cut at a connecting portion with a spoke 2 so that the cut portion or segment has a ring shape and a required length. Both ends of the cut portion are butted to form the ring shape. Then, in a similar manner as shown in FIG. 8, a U-shaped thin metal sheet 41 is butted against the rim portion and is wrapped in a joining piece 42 of a braided sleeve of unidirectional fiber to form an integral structure. Then, this integral structure is placed in a metal mold (not shown), and a liquid thermosetting resin 11 is injected, impregnating the braided sleeves with the resin, and cured by heating. In this manner, a steering wheel strengthened against bending and torsion, and having a thin outer molded layer 11, and two layers of sleeves 21a and 21b braided at two different angles is manufactured.

In the present invention, besides the first and second embodiments described above, various modified embodiments are further considered. Carbon steel is commonly used as the core material of the rim 1, spoke 2, and boss 3 to insure the required strength. As a result, in winter, especially in a cold district, portions of the core material of the rim 1, spoke 2, etc., formed of carbon steel are cooled, and consequently the steering wheel is at a low temperature. Thus, when the driver touches the steering wheel at the start of driving or getting into the vehicle from the outside, his fingers will be cooled and driving feelings will become dull. Such a situation poses a problem in that rapid steering in a critical moment will be disturbed and a serious accident may result.

Figure 21:
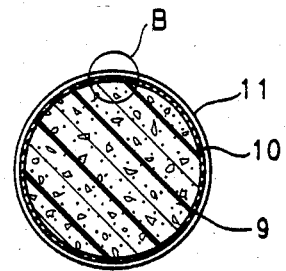
Figure 22:
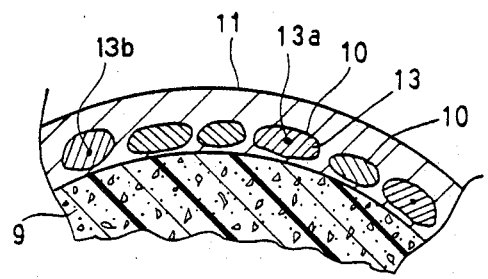
Figure 23:
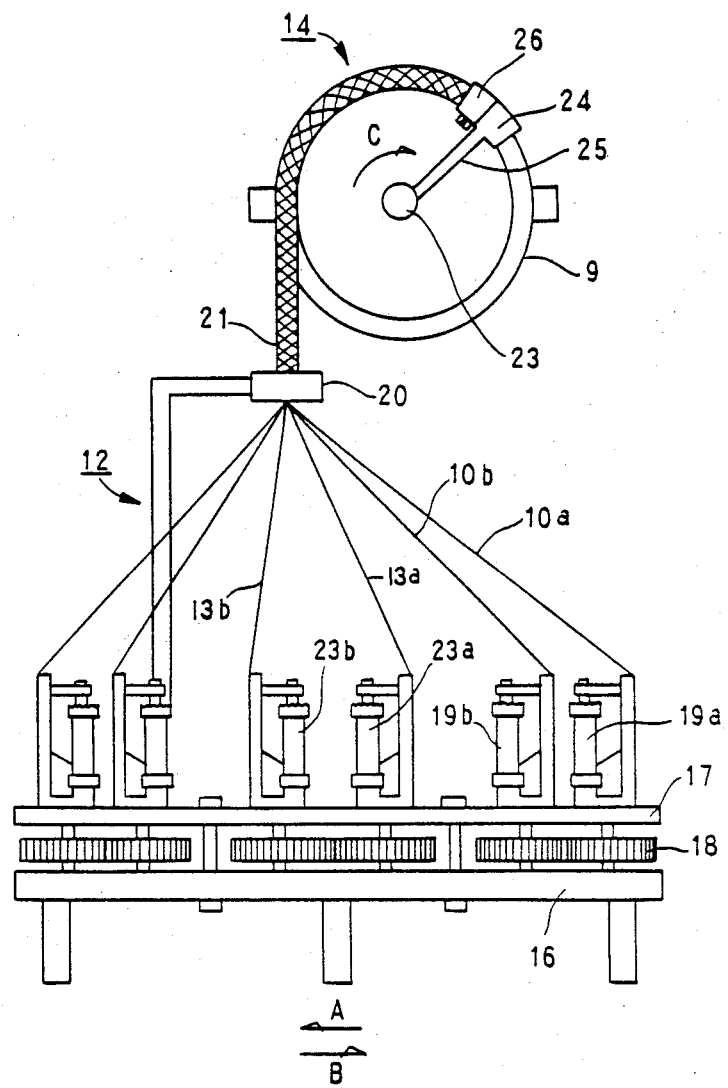

FIGS. 21 and 23 show another embodiment of a steering wheel in which a braided sleeve including a heating wire is used surrounding the core material of the rim, and by energizing the heating wire to warm the braided sleeve, the driver will feel warm when he touches the steering wheel with his fingers. In FIGS. 21-23, reference numeral 9 designates a coil-shaped lightweight core material formed of foamed urethane or the like, numeral 10 designates unidirectional fibers consisting of a sole or composite body of carbon fiber, glass fiber, or aramid fiber, and numeral 13 designates a heating wire having a nichrome wire 13a or 13b covered with electrically insulating unidirectional fiber such as glass fiber or the like. Reference numeral 21 designates a braided sleeve formed by braiding the unidirectional fibers 10 and the heating wire 13 covered with glass fiber, which covers or surrounds the core material 9 of the rim 1. The coil-shaped lightweight core material 9 covered with the sleeve 21 is produced by a braiding machine 12 and a covering apparatus 14 as will be described later.

In FIG. 23, like numerals refer to like parts in FIG. 12, and descriptions of these parts and their operation are omitted. Reference numerals 23a and 23b designate bobbins also mounted on the upper plate 17 and movable respectively in the opposite directions of arrows A and B. The heating wires 13a and 13b covered with glass fibers are set on the bobbins 23a and 23b.

In manufacturing the steering wheel the sleeve 21 is braided from the unidirectional fibers 10a, 10b and the heating wires 13a, 13b covered with glass fibers, and the coil-shaped lightweight core material 9 is, after being covered with the braided sleeve, cut at a connecting portion 30 with the spoke 2 and butted at its ends as described above. In this case, wiring for the heating wire 13 is effected at this cut surface, and the cut surface is worked so that the heating wire 13 can be connected to an energizing section (not shown) prepared in a steering shaft to which the steering wheel is attached.

Modification, with reference to FIGS. 15 and 16, at the time when the thermosetting resin 11 is injected into the cavity 34, a delustering treatment may be applied on the inside of the cavity, in particular, on a portion such as the joining portion between the rim and spoke in which irregularities of the fiber alignment are apt to be caused. By virtue of the effect of the diffuse reflection at such portion alone, the irregularity of fiber in the inside is not visible, and thus, the appearance of the steering wheel can be improved.

In another modification, not shown, a drawing, a character, or a decorative pattern may be displayed partially or all over the core material of the rim, which is then covered with a braided sleeve and impregnated with a transparent thermosetting resin and cured by heating so that a steering wheel having on the inside thereof, the drawing, character or decorative pattern visible from the outside through the braided sleeve and the transparent thermosetting resin is obtained. Accordingly, by merely changing the display, steering wheels or various kinds of color tones can be molded with the same outer layer mold, and the advantage of such steering wheels is that the colors appear visibly without being stained or vanished even when the steering wheels are used for a long time, and the steering wheels providing the feeling or sense which has not been realized in the prior art can be obtained.

We claim:

1. A method for manufacturing a vehicle steering wheel having a ring-shaped rim (1) forming a hand grip, a boss (3) for connection to a steering shaft, and a spoke (2) connecting the rim and the boss integrally, said method comprising the steps of:
   (a) forming a braided sleeve (21) by braiding in a sleeve shape a plurality of unidirectional fibers (10);
   (b) inserting a lightweight core (9) of said rim into said braided sleeve;
   (c) cutting said core covered with said braided fiber sleeve into a predetermined length of a ring shape;
   (d) butt joining both ends of said cut length to form a ring-shaped rim;
   (e) joining said ring-shaped rim and said spoke; and
   (f) forming an outer molded layer (11), after the joining steps, by placing said joined rim and spoke in a metal mold, injecting a thermosetting resin into the mold, and curing said thermosetting resin.

2. A method according to claim 1, wherein said core is formed into a coil shape before its insertion into the sleeve.

3. A method according to claim 2, wherein said coil-shaped core is disposed so that one end thereof is opposite an end of said braided sleeve, and said braided sleeve end is moved successively along said core.

4. A method according to claim 1, wherein said core is provided with a display of a drawing, a character, or a decorative pattern on an outer surface thereof before its insertion into the sleeve, and the thermosetting resin is transparent.

5. A method according to claim 1, 2 or 4, wherein at least one of said braided sleeve fibers incorporates a heating wire.

6. A method according to claim 1, 2 or 4, wherein said braided sleeve fibers are impregnated with said thermosetting resin, and a layer of said thermosetting resin is formed surrounding and overlying said sleeve fibers.

7. A method according to claim 1, 2, or 4, wherein said metal mold is evacuated before said thermosetting resin is injected therein.

8. A method according to claim 1, wherein said braided sleeve has two layers of braided fibers defining outer and inner sleeve layers (21b, 21a).

9. A method according to claim 8, wherein said inner sleeve layer comprises glass fibers and said outer sleeve layer comprises carbon fibers.

10. A method according to claim 1, wherein at least part of a cavity of said metal mold is subjected to delustering treatment.

11. A method according to claim 1, wherein a joining piece of a braided sleeve of unidirectional fiber, or of a cloth is used to join said ring-shaped rim and said spoke.

12. A method according to claim 1, wherein after said thermosetting resin is injected and cured, an outer layer of a material having a smooth feel such as rubber or foamed plastic is molded surrounding the layer of thermosetting resin.

* * * * *